United States Patent
Albasheir et al.

(10) Patent No.: US 11,611,927 B2
(45) Date of Patent: Mar. 21, 2023

(54) SELECTION OF USER PLANE FUNCTIONS AND HANDOVER OF SUBSCRIBER SESSIONS

(71) Applicant: T-Mobile USA, Inc., Bellevue, WA (US)

(72) Inventors: Suliman Albasheir, Issaquah, WA (US); Rahul Pal, Bellevue, WA (US); Karunakalage Viraj Rakitha Silva, Renton, WA (US); Muhammad Waqar Afzal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 182 days.

(21) Appl. No.: 17/105,323

(22) Filed: Nov. 25, 2020

(65) Prior Publication Data

US 2021/0160761 A1    May 27, 2021

Related U.S. Application Data

(60) Provisional application No. 62/940,824, filed on Nov. 26, 2019.

(51) Int. Cl.
| | |
|---|---|
| *H04W 4/00* | (2018.01) |
| *H04W 48/04* | (2009.01) |
| *H04W 8/24* | (2009.01) |
| *H04W 76/11* | (2018.01) |
| *H04W 64/00* | (2009.01) |

(52) U.S. Cl.
CPC .......... *H04W 48/04* (2013.01); *H04W 8/245* (2013.01); *H04W 64/003* (2013.01); *H04W 76/11* (2018.02)

(58) Field of Classification Search
CPC ..... H04W 48/04; H04W 76/11; H04W 8/245; H04W 64/003
See application file for complete search history.

(56) References Cited

U.S. PATENT DOCUMENTS

| | | | |
|---|---|---|---|
| 2020/0120549 A1* | 4/2020 | Sun | H04W 36/12 |
| 2021/0219357 A1* | 7/2021 | Talebi Fard | H04L 47/28 |
| 2021/0243826 A1* | 8/2021 | Hoffmann | H04W 76/11 |

* cited by examiner

*Primary Examiner* — Justin Y Lee
(74) *Attorney, Agent, or Firm* — Lee & Hayes, P.C.

(57) ABSTRACT

A telecommunication network associated with a wireless telecommunication provider can be configured to select user-plane functions (UPFs) for a user equipment (UE) in a network, and the handover of subscriber sessions. According to some configurations, a nearest UPF to the UE can be picked to service the UE. Choosing the nearest UPF may reduce latency to the UE when sending and receiving packets through a cellular network, such as a 5G network. Subscriber sessions can be handed over across multiple UPFs based on mobility of the UE. Subscriber sessions may be anchored on UPFs located either on edge locations or centralized data centers. Because of mobility of subscribers from a first location (e.g., x) to a second location (e.g., y), a subscriber's session can be moved from one user plane node to another user plane node seamlessly.

17 Claims, 7 Drawing Sheets

SELECTION OF USER PLANE FUNCTIONS AND HANDOVER OF SUBSCRIBER SESSIONS

CROSS-REFERENCE TO RELATED APPLICATIONS

This application claims priority to U.S. Provisional Patent Application No. 62,940,824 entitled "Selection of Network Functions and Handover of Subscriber Sessions," filed Nov. 26, 2019, which is incorporated herein by reference in its entirety.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
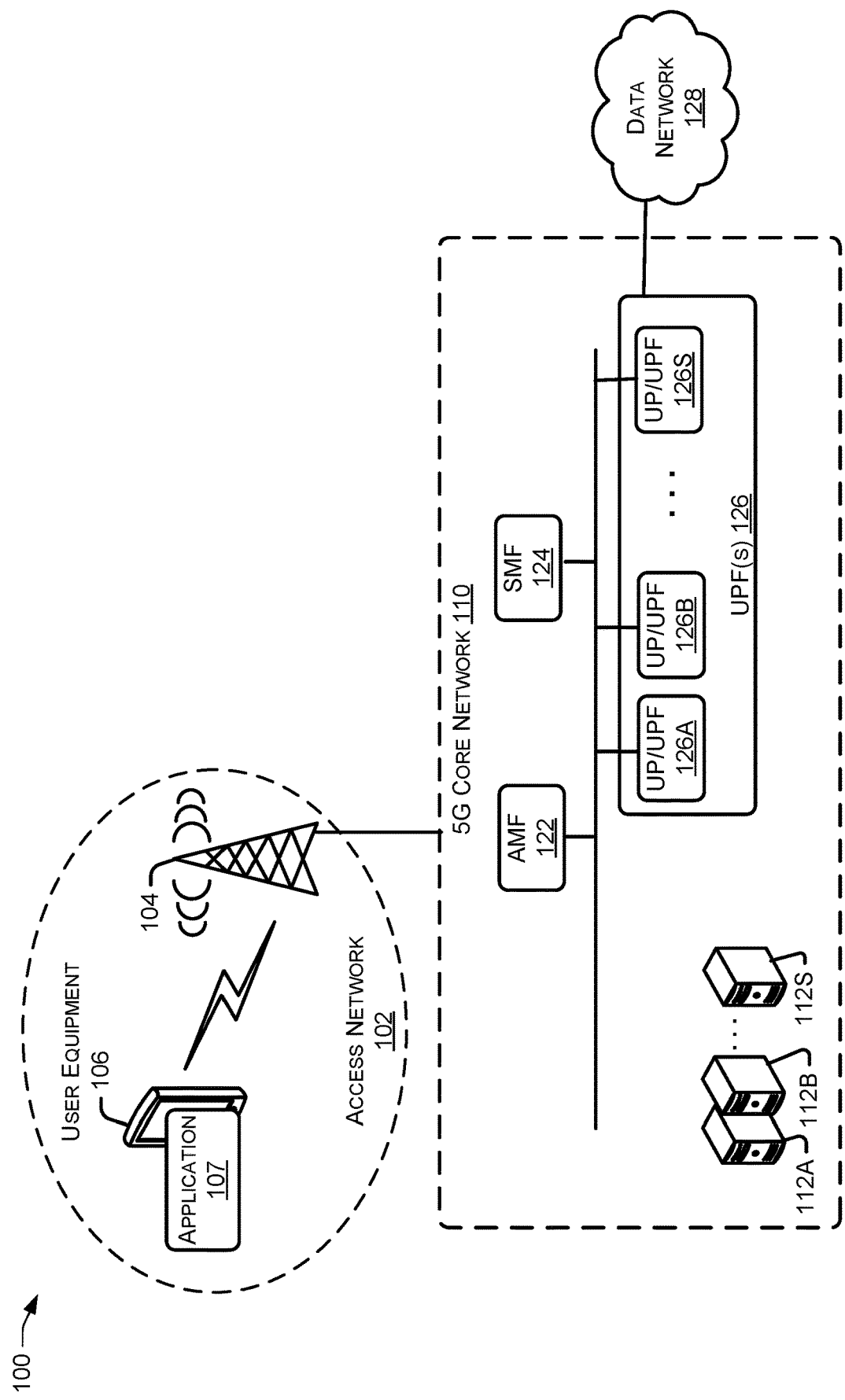
FIG. 1 is a block diagram of an illustrative environment showing selection of user plane functions (UPFs) and handover of subscriber sessions.

Described herein are techniques and systems relating to selecting user-plane functions (UPFs) which may also be referred to herein as user plane nodes (UPs), for a user equipment (UE) in a network, and the handover of subscriber sessions. Using techniques described herein, a nearest UPF to the UE can be picked to service the UE. Choosing the nearest UPF may reduce latency to the UE when sending and receiving packets through a cellular network, such as a 5G network. On the other hand, not choosing the nearest UPF to the UE may add latency when delivering packets to the UE.

In some examples, the UE requests a new session that is received by an Access and Mobility Management Function (AMF). The AMF receives these requests and handles connection or mobility management requests while forwarding session managementrequirements over the N11 interface to the SMF. The AMF may determine which SMF is best suited to handle the connection request by querying a network Repository Function (NRF). According to some configurations, the Session Management Function (SMF) may access and/or store data that identifies the connected cell-IDs associated with tilts and the corresponding connected UPFs.

The SW may choose the UPF to use based, at least in part, on the cell-ID sent by the UE and the location of the UE. According to some configurations, the SMF may also use other data to assist in determining what UPF to use. For example, the SMF may use available bandwidth, current usage statistics, forecasted usage statistics, and/or some other data that may indicate capability of the UPl' to provide service at a desired level to the UE.

In some configurations, the gNobeB (gNb) coupled to the UE provides the cell-ID along with the UPFs connected in the N3 interface. The gNb may also pass the routing infoimation which may indicate a route between gNb and the UPF. According to some examples, the UE passes the cell-id information in an N1N2 message towards the SW. The SMF receives this information and builds a list of gNb, cell-IDs and UPFs. Using this data, the SMF may pick the nearest UPF for the new communication request. In other examples, one or more different nodes and/or components may be used to determine and select the UPF to use.

According to some configurations, network deployments in MNOs mobile network Operators) may consist of multiple user plane functions located on edge locations and/or centralized data centers. In order to support some use cases (e.g. low latency applications) there may be a benefit to offload traffic to UPF nodes located near edge locations. Generally, nodes on the user plane handle the processing of packets between radio access network (RAN) and a data network. The UPFs provide functionalities such as access control, encapsulationldecapsulation, bearer lookup, service data flow (SDF) mapping, per-flow Quality of Service (QoS), guaranteed bit rate (GBR), maximum bit rate (MBR), forwarding of packets, packet inspection, and the like. In some examples, a control plane node(s) may select user plane nodes based on location information of the UE and the location of the user plane nodes that may provide a requested service.

In today's telco deployments, control plane NFs do not have the logic to intelligently route traffic to selective user plane nodes located in a specific location. In some configurations, the location of the UE may be identified through a location identifier (per 3GPP standards) being communicated to the control plane during mobility events (e.g., the UE moves to a different location). Using the location information such as the identifier, one or more control plane nodes may select user plane nodes located either on edge location or a data center.

According to other examples, techniques for seamless handover of subscriber sessions across multiple UPFs based on mobility of a user are described herein. Subscriber sessions may be anchored on UPFs located either on edge locations or centralized data centers. Because of mobility of subscribers from a first location x) to a second location e.g., y), there may be a benefit to move a subscriber's session from one user plane node to another user plane node seamlessly. Today's telco deployments don't support seamless handover of subscriber sessions when moving across user plane nodes located either in edge or data centers.

In some configurations, in order to support seamless mobility of subscriber session across user plane nodes, a control plane node is able to use location information, such as a location identifier of a UE and uses the location to assist in determining what user plane node to anchor the session (e.g., move from a user plane node located on an edge to a user plane node located in a data center, or some other location). In the example, when the session is anchored on user plane node in a data center and then the subscriber moves to a different geographic location (e.g., closer to the edge), the control plane seamlessly moves or transfers the session to a new user plane node.

The systems, devices, and techniques described herein can improve a functioning of a network by providing an architecture to select UPFs, and handover subscriber sessions from one node to another node using the location of the UE and the nodes within the network. For example, selecting a UPF closer to the TIE may result in lower latency experienced by the UE. Similarly, handing over a session to a closer UPF may result in better performance for the UE. These and other improvements to the functioning of a computer and network are discussed herein. More details are provided below with reference to FIGS. 1-7.

FIG. 1 is a block diagram of an illustrative environment showing selection of user plane functions and handover of subscriber sessions. The environment 100 may include an access network 102, a 5G core network 110, and a data network 128 that is associated with a wireless service provider(s). The environment 100 is illustrated in simplified form and may include many more components.

The environment 100 may include cells, such as cell 104, that may be wireless or wired that are coupled to 5G core network 110 and/or some other network. The environment 100 may also include one or more access points (not shown), and one or more gateways (not shown). A cell, such as cell 104, may handle traffic and signals between electronic devices, such as the user equipment 106, and 5G CN 110. For example, a cell 104 may perform the transcoding of speech channels, allocation of radio channels to electronic devices, paging, transmission and reception of voice and data, as well as other functions. A cell 104 may include several base transceiver stations (BTS), each BTS may include a transceiver, antenna, and additional network switch and control equipment that provide a network cell for facilitating wireless communication between UE computing devices and the core network 110 and/or other networks. In some examples, the cells 104 may include a gNodeB and/or an eNodeB.

The UE 106 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 102, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with 5G CN 110, and/or other cellular networks. The UE 106 can further be configured to establish or receive a communication session, such as a voice call, a video call, or another sort of communication.

In some configurations, one or more nodes, such as nodes 112 illustrated in 5G CN 110 may be configured as one or more application servers that provide support for one more applications, such as application 107 used by one or more computing devices, such as UE 106. Some example applications include, but are not limited to browser applications, messaging applications, voice applications (e.g., Voice over Internet Protocol "VoIP" applications), video applications, and the like.

While the nodes 112 are illustrated within the 5G CN 110, one or more other computing devices may be located outside of these networks. For example, an application server, or some other server or device, may be connected to a network via one or more external packet switched networks, such as the Internet.

According to some configurations, a telephony client application, such as application 107, on the UE 106 may establish data communication with the network 110 through a data connection to the cell 104. The cell 104 may route a communication wired/wirelessly from the UE 106 through the access network 102 for communication to the 5G CN 110. In general, a cell 104 can be implemented as a variety of technologies to provide wired and/or wireless access to the network, as discussed herein. In some instances, the cell 104 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the cell 104 can include any number and type of transceivers and/or base stations representing any number and type of macrocells, microcells, picocells, or femtocells, for example, with any type or amount of overlapping coverage or mutually exclusive coverage.

When a communication request arrives at the network 110, one or more of the nodes 112 may determine the identity of the originating computing device for the communication (e.g., using a telephone number, IMEI, IMSI, IP address) as well as the identity of the computing devices to send the communication. In some configurations, one or more of the nodes 112 may be used to determine the identity of the originating computing device for the communication as well as the identity of the computing devices to send the communication. According to some configurations, a UE 106 may connect to the service nodes 112, or some other component such as an application server, via the Internet (not illustrated).

As illustrated, the environment 100 includes one or more servers, including nodes 112, to facilitate communications by and between the various devices in the environment 100 and perform operations relating to using the data network 128, and/or other networks. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 100 (e.g., nodes 112A-112S that provide user plane nodes, AMF 122, SMF 124, UP/UPFs 126, websites, etc.). While FIG. 1 illustrates an example environment 100, it is understood in the context of this document, that the techniques discussed herein may also be implemented in other networking technologies.

As briefly discussed above, the 5G core network 110 may expose network Functions (NTs) to nodes within the network 110, and/or nodes within some other network, such as network 128. As illustrated, the 5G CN exposes AMF 122, SMF 124, and UP/UPFs 126. In some examples, the nodes use a standard Application Programming Interface (API) to communicate. Using the API, a node, such as a node in the network 128, can communicate with any node in the 5G CN 110.

As briefly discussed above, a UE, such as UE 106 may use user plane nodes that are selected based, at least in part, on a location of the UE 106. For example, a UP/UPF 126 may be selected that is nearest to the UE 106. Choosing the nearest UP/UPF 126 may reduce latency to the UE 106 when sending and receiving packets through a cellular network, such as a 5G network. On the other hand, not choosing the nearest UP/UPF 126 to the UE 106 may add latency when delivering packets to the UE 106.

In some examples, the UE 106 requests a new session that is received by an AMF 122. The AMF 122 receives the request from the UE 106 and handles connection or mobility management requests while forwarding session management requirements to the SME 124. The AME 122 may determine which SMF 124 to use by querying a network Repository Function (NRF), such as NRF 222 illustrated in FIG. 2. According to some configurations, the SMF 124 may access and/or store data that identifies the connected cell-IDs associated with UEs and the corresponding connected UP/UPFs.

In some examples, the SMF 124 chooses the UP/UPF 126 to use based, at least in part, on the cell-ID sent by the UE and the location of the UE. According to some configurations, the SMF 124 may also use other data to assist in determining what UP/UPF 126 to use. For example, the SMF 124 may use available bandwidth, current usage statistics, forecasted usage statistics, and/or some other data that may indicate capability of the UP/UPF 126 to provide service at a desired level to the UE 106. As a particular example, the SMF 124 may determine that UP/UPF 126B is closest to the UE 106, UP/UPF 126A is second closest to the UE 106, and UP/UPF 126S is farthest from the UE 106. The SMF 124 may also determine that UP/UPF 126B has sufficient resources available to handle the session for UE 106. As such, the SMF 124 may select and use the UP/UPF 126B. More details are provided below with regard to FIGS. 2-7.

Figure 2:
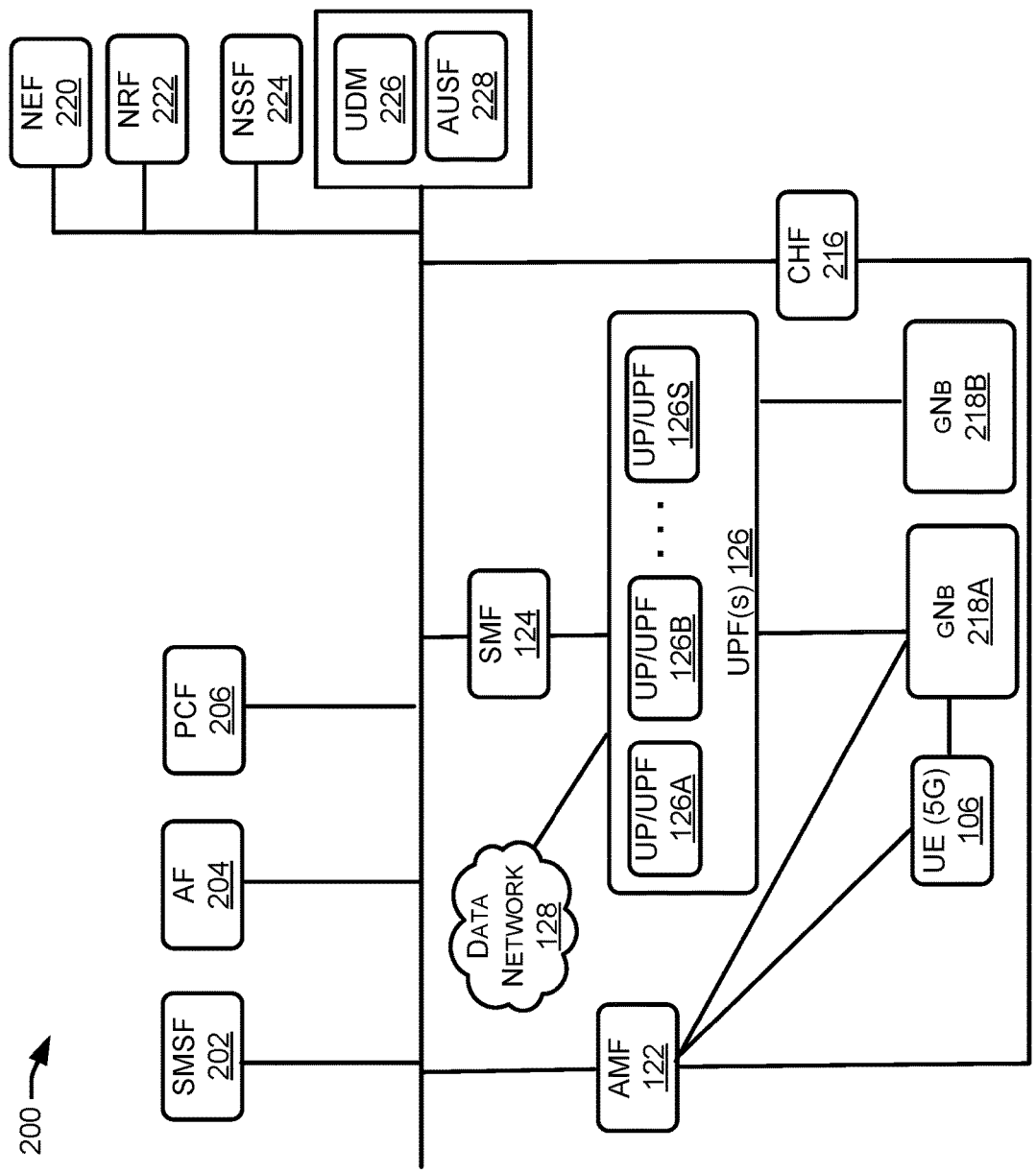
FIG. 2 is a block diagram of an illustrative environment including a 5G core network showing selection of UPFs and handover of subscriber sessions.

FIG. 2 is a block diagram of an illustrative environment including a 5G core network showing selection of network functions and handover of subscriber sessions. The environment 200 illustrates additional details (compared to FIG. 1) on exemplary NFs exposed by 5G CN 110.

According to some configurations, different NFs, such as NFs 122, 124, 126, 202, 204, 206, 208, 212, 214, 216, 220, 222, 224, 226, 228, 230, 232, 234, 236, 238, 240, 242, 244, and 246, are connected together using a common API which may be referred to herein as a service-based interface (SBI). In some examples, a NF service can directly access other NF services without having to pass through another node. In some configurations, a network repository function (NRF) 222 may be used as a discovery mechanism for identifying available NF services. Various NFs associated with the network 110 and/or 114 may indicate capabilities during a discovery procedure to the NRF 222 associated with the network 104. The NFs may further implement network function registration.

In some configurations, the gNobeB (gNb) 218A coupled to the UE 106 provides the cell-ID along with the UP/UPFs 126 connected in the N3 interface. A gNb 218 may also pass the routing information which may indicate a route between gNb 218 and a UP/UPF 126. According to some examples, the UE 106 passes the cell-id information in an N1N2 message towards the SMF 124. The SMF 124 receives this information and builds a list of gNb, cell-IDs and UP/UPFs. Using this data, the SW' 124 may pick the nearest UP/UPF 126 for the new communication request. For example, when UE 106 is connected to gNB 218A, the nearest UP/UPF 126 may be selected from UP/UPF 126A-UP/UPF126S, whereas when UE 106 is connected to gNb 218B then the nearest UP/LPF 126 may be selected from UP/UPF 126A UP/UPF126S. In other examples, one or more different nodes and/or components may be used to determine and select the UP/UPF 126 to use.

According to some configurations, network deployments in MNOs (Mobile network Operators) may consist of multiple user plane functions located on edge locations and/or centralized data centers. In order to support some use cases (e.g. low latency applications) there may be a benefit to offload traffic to user plane nodes located near edge locations. Generally, nodes on the user plane handle the processing of packets between radio access network (RAN) and a data network. The UP/UPFs 126 provide functionalities such as access control, encapsulation/decapsulation, bearer lookup, service data flow (SDF) mapping, per-flow Quality of Service (QoS), guaranteed bit rate (GBR), maximum bit rate (MBR), forwarding of packets, packet inspection, and the like. In some examples, a control plane node(s) may select user plane nodes based on location information of the LIE and the location of the user plane nodes that may provide a requested service.

In today's telco deployments, control plane NTs do not have the logic to intelligently route traffic to selective user plane nodes located in a specific location. In some configurations, the location of the UE 106 may be identified through a location identifier (per 3GPP standards) being communicated to the control plane during mobility events (e.g., the UE moves to a different location). Using the location information such as the identifier, one or more control plane nodes may select user plane nodes located either on edge location or a data center.

According to other examples, subscriber sessions can be seamlessly handed over across multiple UPs/UPFs based on mobility of a user equipment. Subscriber sessions may be anchored on UPs/UPFs located either on edge locations or centralized data centers. Because of mobility of subscribers from a first location (e.g., x) to a second location (e.g., y), there may be a benefit to move a subscriber's session from one user plane node to another user plane node seamlessly. Today's telco deployments don't support seamless handover of subscriber sessions when moving across user plane nodes located either in edge or data centers.

In some configurations, in order to support seamless mobility of subscriber session across user plane nodes, a control plane node is able to use location information, such as a location identifier of a LIE 106 and uses the location to assist in determining what user plane node to anchor the session (e.g., move from a user plane node located on an edge to a user plane node located in a data center, or some other location). In the example, when the session is anchored on user plane node in a data center and then the subscriber moves to a different geographic location (e.g., closer to the edge), the control plane seamlessly moves or transfers the session to a new user plane node.

The AME 122 connects to UF 106 and gNb 218 and manages LTE 106 related functions. In some examples, access and mobility functions are performed by AMF 122. The PCF 206 corresponds to policy and charging rule control function (PCRF) as may be included in IMS networks. The AF 204 performs a role of an application server and may interact with a 3GPP core network in order to provide services.

Figure 3:
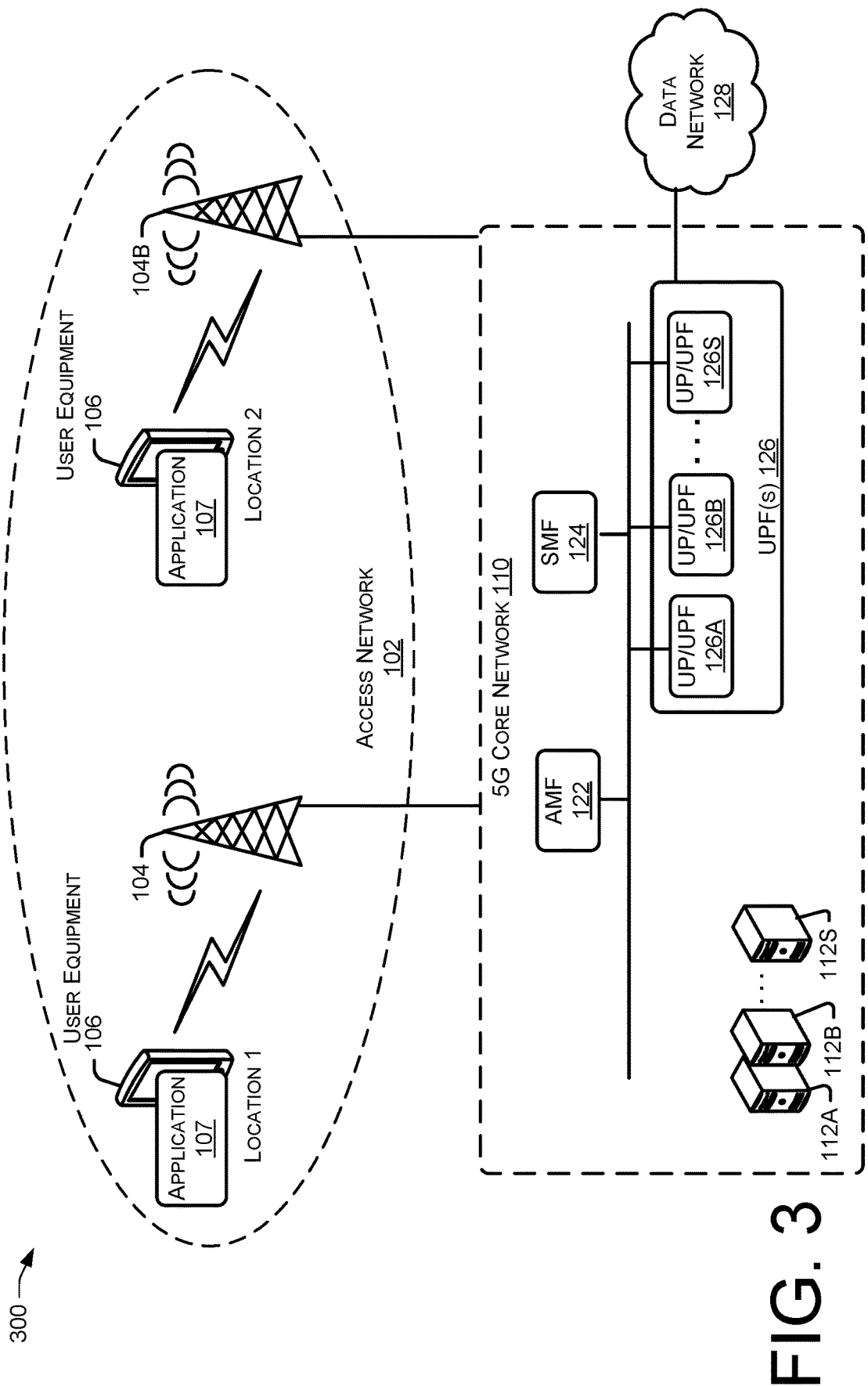
FIG. 3 is a block diagram of an illustrative environment showing selection of UPFs based on movement of a User Equipment (UE).

FIG. 3 is a block diagram of an illustrative environment showing selection of UP/UPFs and selection of UP/UPFs based on movement of a User Equipment. FIG. 3 is similar to FIG. 1 and FIG. 2 but illustrates UE 106 at two different locations.

In the current examples, the UE 106 is initially located at location 1 within access network 102 and then at some point moves to location 2 within access network 102. As discussed above, the SMF 124 may initially select a UP/UPF 126 based, at least in part on, the shortest distance between the UE 106 and one of the UP/UPFs 126. For instance, when UE 106 is at location 1, then UP/UPF 126A may be identified as the closest UP/UPF 126. When UE 106 is at location 2, the UP/UPF 126B may be identified as the closest UP/UPF 126.

As also discussed above, during a subscriber session, the LE 106 may move between location 1 and location 2 making the assigned UP/UPF 126 farther from the UE 106 as compared to one or more of the other UP/UPFs 126. In this particular example, the subscriber session may be handed over from the UP/UPF 126 currently handling the session (e.g., UP/UPF 126A) to a different UP/UPF 126 that is identified to be closer to the UE at location 2 (e.g., UP/UPF 126B).

Figure 4:
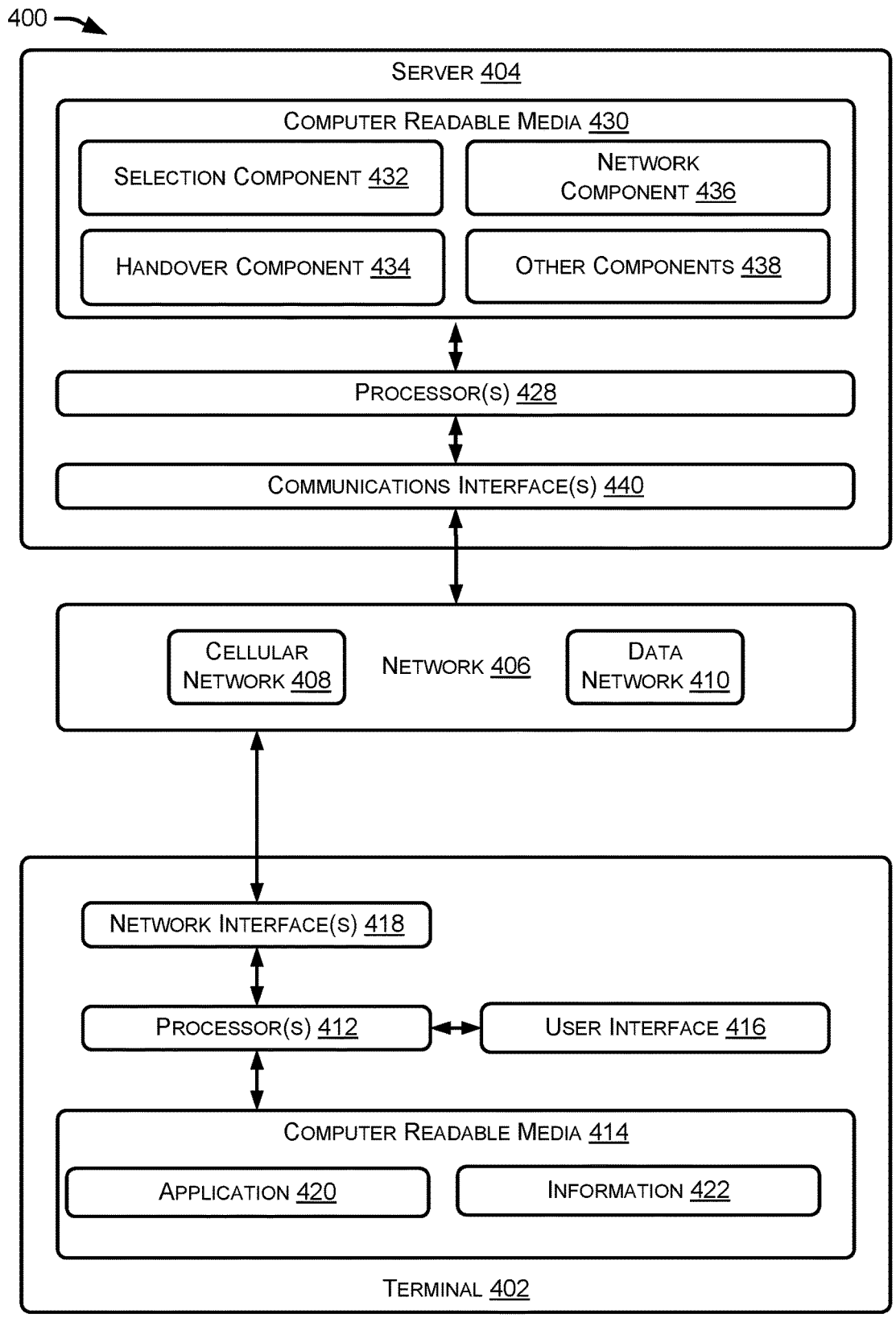
FIG. 4 is a block diagram illustrating a system that includes one or more components for using a network.

FIG. 4 is a block diagram illustrating a system 400 that includes one or more components for using a network, according to some implementations. The system 400 includes a terminal 402, which can represent a UE 106, or another computing device, coupled to a server 404, via a network 406. The server 404 can represent a computing device, such as one or more of the servers within the access network 102, the 5G CN 110, network 114, and/or some other computing device. The network 406 can represent network 110, 128 and/or access network 102, or some other network.

The network 406 can include one or more networks, such as a cellular network 408 and a data network 410. The network 406 can include one or more core network(s) connected to terminal(s) via one or more access network(s). Example access networks include LIE, WWI, GSM Enhanced Data Rates for GSM Evolution (EDGE) Radio Access network (GERAN), UTRAN, and other cellular access networks. Message transmission, reception, fallback, and deduplication as described herein can be performed, e.g., via 3G, 4G, 5G, WIFI, or other networks.

The cellular network 408 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WLMAX), WIFI, and/or any future IP-based network technology or evolution of an existing IP-based network technology. Communications between the server 404 and terminals such as the terminal 402 can additionally or alternatively be performed using other technologies, such as wired (Plain Old Telephone Service, POTS, or PSTN lines), optical (e.g., Synchronous Optical NETwork, SONET) technologies, and the like.

The data network 410 can include various types of networks for transmitting and receiving data data packets), including networks using technologies such as WIFI, IEEE 802.15.1 ("BLUETOOTH"), Asynchronous Transfer Mode (ATM), WINIAX, and other network technologies, e.g., configured to transport iP packets. In some examples, the server 404 includes or is communicatively connected with an IVF or other device bridging networks, e.g., LTE, 3G, and POTS networks. In some examples, the server 404 can bridge SS7 traffic from the PSTN into the network 406, e. g., permitting PSTN customers to place calls to cellular customers and vice versa.

In some examples, the cellular network 408 and the data network 410 can carry voice or data. For example, the data network 410 can carry voice traffic using VoIP or other technologies as well as data traffic, or the cellular network 408 can carry data packets using HSPA, LTE, or other technologies as well as voice traffic. Some cellular networks 408 carry both data and voice in a PS folinat. For example, many LTE networks carry voice traffic in data packets according to the VoLTE standard. Various examples herein provide origination and tell lination of, e.g., carrier-grade voice calls on, e.g., networks 406 using CS transports or mixed VoLTE/5G transports, or on terminals 402 including OEM handsets and non-OEM handsets.

The terminal 402 can be or include a wireless phone, a wired phone, a tablet computer, a laptop computer, a wristwatch, or other type of terminal. The terminal 402 can include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer eadable media (CRM) 414, such as memory (e.g., random access memory (RAM), solid state drives (SSDs), or the like), disk drives (e.g., platter-based hard drives), another type of computer-readable media, or any combination thereof. The CRM or other memory of terminal 402 can hold a datastore, e.g., an SQL or NoSQL database, a graph database, a BLOB, or another collection of data. The terminal 402 can further include a user interface (UI) 416, e.g., including an electronic display device, a speaker, a vibration unit, a touchscreen, or other devices for presenting information to a user and receiving commands from the user. The terminal 402 can further include one or more network interface(s) 418 configured to selectively communicate (wired or wirelessly) via the network 406, e.g., via an access network 102.

The CRM 414 can be used to store data and to store instructions that are executable by the processors 412 to perform various functions as described herein. The CRM 414 can store various types of instructions and data, such as an operating system, device drivers, etc. The processor-executable instructions can be executed by the processors 412 to perform the various functions described herein.

The CRM 414 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer eadable instructions, data structures, program components, or other data.

The CRM 414 can include processor-executable instructions of an application 420. The CRM 414 can store information 422 identifying the teii iinal 402. The information 422 can include, e.g., an IME1, an IMSI identifying the subscriber using terminal 402, or other information discussed above. The CRM 414 can additionally or alternatively store credentials (omitted for brevity) used for access, to IMS or RCS services.

The server 404 can include one or more processors 428 and one or more CRM 430. The CRM 430 can be used to store processor-executable instructions of a selection component 432 which may be configured to select a UP/UPF 126 based, at least in part, on distance from the UE 106, a handover component 434 which may configured to handover a session from one UP/UPF 126 to another UP/UPF 126, a network component 436 that is configured to perform one or more network operations, as well as one or more other components 438. The processor-executable instructions can be executed by the one or more processors 428 to perform various functions described herein.

In some examples, server 404 can communicate with (e.g., is communicatively connectable with) terminal 402 or other devices via one or more communications interface(s) 440, e.g., network transceivers for wired or wireless networks, or memory interfaces. Example communications interface(s) 440 can include ETHERNET or FIBRE CHANNEL transceivers, WWI radios, or DDR memory-bus controllers (e.g., for DMA transfers to a network card installed in a physical server 404).

In some examples, processor 412 and, if required, CRM 414, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 428 and, if required, CRM 430.

Figure 5:
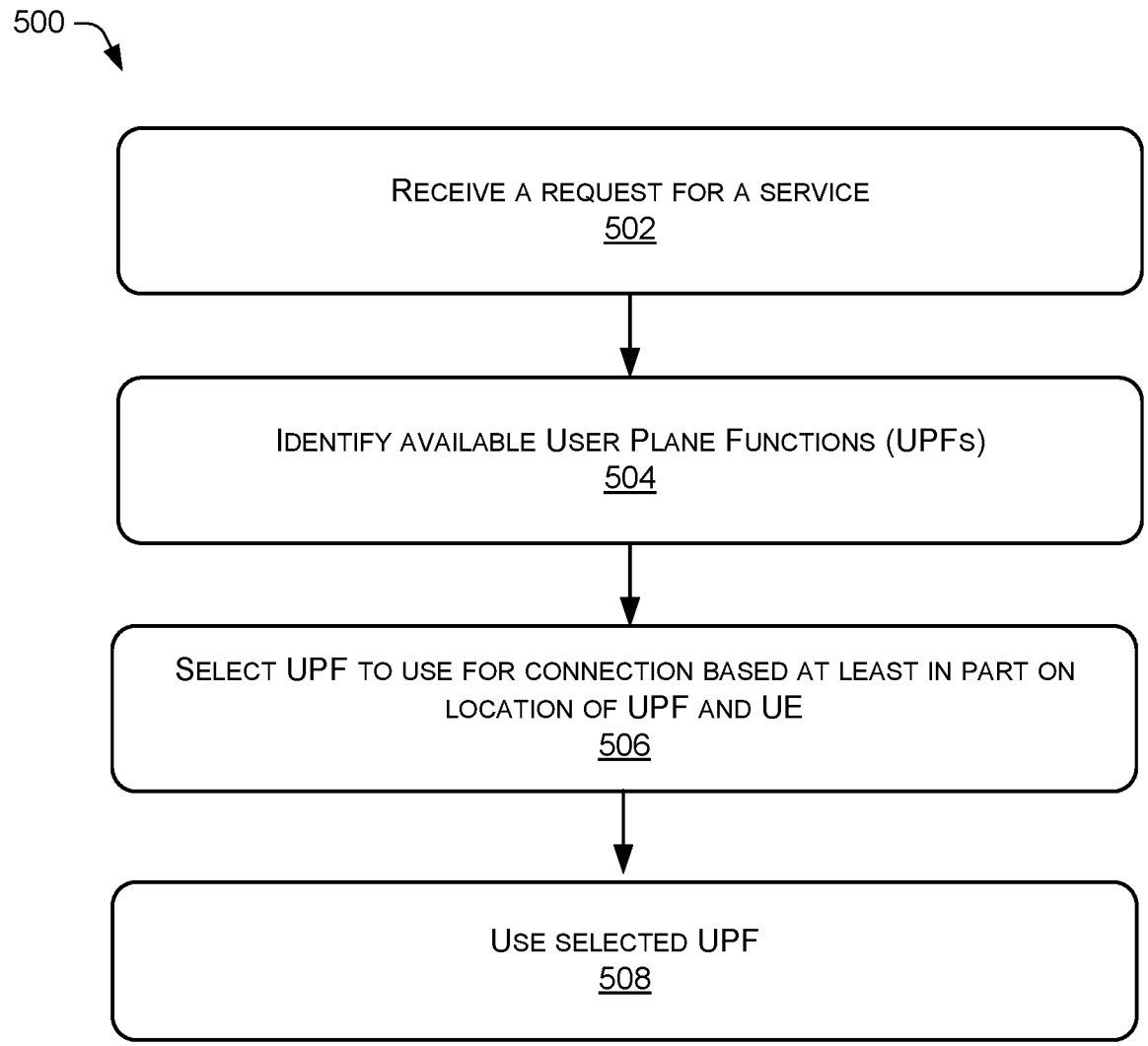
FIG. 5 is a flow diagram of an example process that includes selecting a UPF based on location of a UE.
Figure 6:
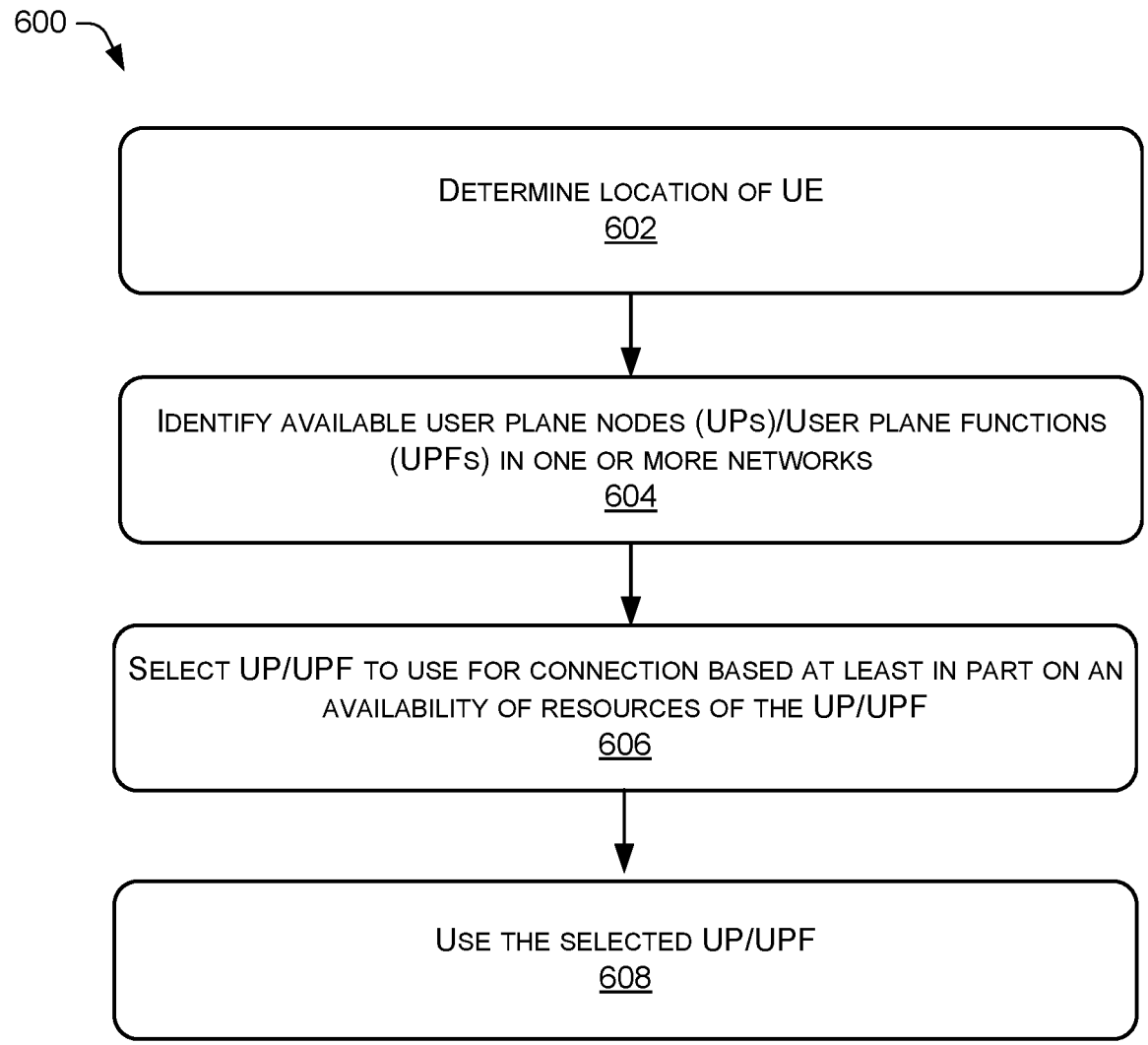
FIG. 6 is a flow diagram of an example process that includes selecting a UP/UPF based on location of a UE.
Figure 7:
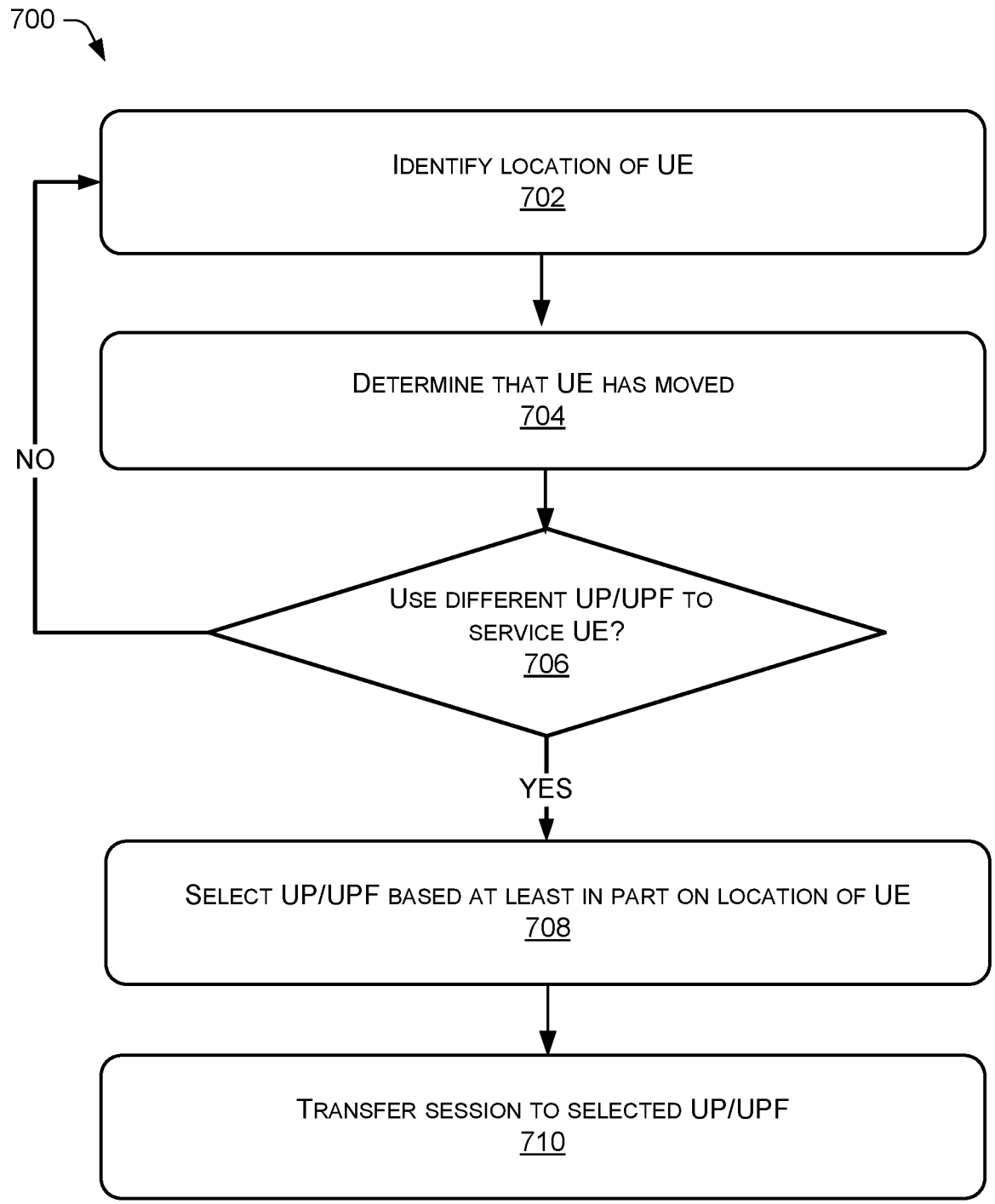
FIG. 7 is a flow diagram of an example process that includes handover of a subscriber session to a different UPF based on ovement of a UE.

FIGS. 5-7 illustrate example processes. The example processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 is a flow diagram of an example process that includes selecting a UP/UPF 126 based on location of a UE 106, according to some implementations. The process includes, at 502, receiving, within a network 110, a request for service. As discussed above, the request for service may be associated with a subscriber session of the UE 106.

At 504, available UP/UPFs 126 are identified. As discussed above, the SMF 124, or some other node or component, may identify the UP/UPFs 126 that are available to service the subscriber session. In some configurations, the gNobeB (gNb) coupled to the LE 106 provides the cell-ID along with the UP/UPFs connected in the N3 interface. According to some examples, the UE passes the cell-id information in an NIN2 message towards the SMF. The SMF receives this information and builds a list of gNb, cell-IDs and UP/UPFs.

At 506, the UP/UPF 126 to use for the connection to the UE 106 is selected based, at least in part, on the location of the UP/UPF 126 and the UE 106. As discussed above, in some examples, the nearest UP/UPF 126 to the UE 106 is selected. In some cases, a different UP/UPF 126 may be selected (e.g., the next nearest UP/UPF 126) when the nearest UP/UPF 126 does not have available resources to handle the session. In some examples, the UP/UPF to use based, at least in part, on the cell-ID sent by the UE and the location of the UE. According to some configurations, the SNIF may also use other data to assist in determining what UP/UPF to select. For example, the available bandwidth, current usage statistics, forecasted usage statistics, and/or some other data that may indicate capability of the UP/UPF to provide service at a desired level to the UE 106.

At 508, the selected UP/UPF 126 is used to service the session.

FIG. 6 is a flow diagram of an example process that includes selecting a user plane node, such as a UP/UPF, based on location of a UE 106, according to some implementations. The process includes, at 602, determining the location of the UE 106, For example, the SMF 124, or some other node may maintain information identifying the current location of the UE 106.

At 604, the available UPs/UPFs in one or more networks are identified to perform the equested service. As discussed above, the UPs/UPFs may be near an edge, near a data center, or at some other location.

At 606, the UPs/UPFs is selected based at least in part on an availability of resources of the UP/UPF. As discussed above, in some examples, the nearest UP/UPF to the UE 106 may not have available resources to perform the requested service. In some cases, a different UP/UPF is selected (e.g., the next nearest UP/UPF) when the nearest UP/UPF does not have available resources to handle the request.

At 608, the selected UP/UPF is used.

FIG. 7 is a flow diagram of an example process that includes handover of a subscriber session to a different UP/UPF based on movement of a UE, according to some implementations. The process includes, at 702, determining the location of the UE 106. For example, the SMF 124, or some other node may maintain information identifying the current location of the UE 106.

At 704, a determination is made as to whether the UE 106 has moved. As discussed above, the UE 106 may move from one location to another. In some configurations, the location of the UE may be identified through a location identifier (per 3GPP standards) being communicated to the control plane during mobility events (e.g., the UE moves to a different location).

At 706, a decision is made as to whether to use a different UP/UPF 126 to service the UE 106. As discussed above, the decision may be made by the SMF 124, or some other node, based on whether or not the UE 106 is now closer to a different node (e. g., a UP/UPF 126) that may perform the operation. In some examples, the decision is whether to handover a subscriber session from one UP/UPF 126 to another UP/UPF 126. When a different UP/UPF 126 is to be used, the process 700 moves to 708. When a different UP/UPF 126 is not to be used, the process 700 returns to 702.

At 708, the UP/UPF, is selected based at least in part on the location of the UP/UPF 126 and the UE 106. As discussed above, in some examples, the nearest UP/UPF 126 to the UE 106 is selected that may be used to perform the requested service. In some cases, a different UP/UPF 126 may be selected (e.g., the next nearest UP/UPF) when the nearest UP/UPF does not have available resources to handle the session.

At 710, the session is handed over to the selected UP/UPF.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
   one or more processors;
   a memory; and
   one or more components stored in the memory and executable by the one or more processors to perform operations comprising:
      identifying a location of a user equipment (UE) within a cellular network;
      identifying one or more user plane nodes (UPs) available to service a session associated with the UE;
      selecting a user plane node (UP) from the one or more UPs to service the session associated with the UE based at least in part on the location;
      using the UP to service the session; and
      determining, via a Session Management Function (SMF) to use a different UP, wherein the SMF selects the different UP based, at least in part, on information received from a base station connected to the UE, the information indicating user plane functions (UPFs) connected to the base station, a cell-ID associated with the base station, and routing information indicating routes between the base station and UPFs,
      wherein the SMF builds a list from the UPFs, cell-ID, and routing information from the base station, as well as UPFs, cell-IDs, and routing information from other base stations, and determines to use the different UP based on the list.

2. The system of claim 1, the operations further comprising:
   determining that the UE has moved to a second location;
   selecting a second UP to service the session based, at least in part, on the second location; and
   transferring the session to the second UP.

3. The system of claim 1, wherein selecting the UP comprises selecting one of the UPFs to service the session.

4. The system of claim 3, wherein the operations further comprise transferring the session to the different UP based, at least in part, on one or more of an availability of resources of the different UP and a movement of the UE.

5. The system of claim 1, wherein selecting the UP comprises:
   determining that the UE is a first distance from the UP;
   determining that the UE is a second distance from a second UP; and
   selecting the UP based, at least in part, on the first distance being shorter than the second distance.

6. The system of claim 1, wherein selecting the UP comprises:
   determining an availability of resources of the UP; and
   selecting the UP based at least in part on the availability of the resources.

7. The system of claim 1, wherein selecting the UP is further based on one or more of an available bandwidth, current usage statistics, and forecasted usage statistics of the UP that indicate a capability of the UP to provide service at a specified level to the UE.

8. A computer-implemented method performed by one or more processors configured with specific instructions, the computer-implemented method comprising:
   identifying a location of a user equipment (UE) within a cellular network;
   identifying user plane nodes (UPs), that include user plane functions (UPFs), available to service a session associated with the UE;
   selecting a user plane function (UPF) from the UPFs to service the session associated with the UE based at least in part on the location;
   using the UPF to service the session; and
   determining, via a Session Management Function (SMF) to use a different UPF, wherein the SMF selects the different UPF based, at least in part, on information received from a base station connected to the UE, the information indicating a subset of the UPFs, the subset of the UPFs being connected to the base station, a cell-ID associated with the base station, and routing information indicating routes between the base station and the subset of the UPFs,
   wherein the SMF builds a list from the UPFs, cell-IDs, and routing information and determines to use the different UPF based on the list.

9. The computer-implemented method of claim 8, further comprising:
   determining that the UE has moved to a second location;

selecting a second UPF to service the session based, at least in part, on the second location; and transferring the session to the second UPF.

10. The computer-implemented method of claim 8, further comprising transferring the session to the UPF based, at least in part, on one or more of an availability of resources of the UPF and a movement of the UE.

11. The computer-implemented method of claim 8, wherein selecting the UPF comprises:

determining that the UE is a first distance from the UPF;

determining that the UE is a second distance from a second UPF; and selecting the UPF based, at least in part, on the first distance being shorter than the second distance.

12. The computer-implemented method of claim 8, wherein selecting the UPF comprises:

determining an availability of resources of the UPF; and selecting the UPF based at least in part on the availability of the resources.

13. The computer-implemented method of claim 8, wherein selecting the UPF is further based on one or more of an available bandwidth, current usage statistics, and forecasted usage statistics of the UPF that indicate a capability of the UPF to provide service at a specified level to the UE.

14. A non-transitory computer-readable media storing computer-executable instructions that, when executed, cause one or more processors of a computing device to perform acts comprising:

identifying a location of a user equipment (UE) within a cellular network;

identifying user plane functions (UPFs) available to service a session associated with the UE;

selecting a user plane function (UPF) from the one or more UPFs to service the session associated with the UE based at least in part on the location;

using the UPF to service the session; and determining, via a Session Management Function (SMF) to use a different UPF, wherein the SMF selects the different UPF based, at least in part, on information received from a base station connected to the UE, the information indicating a subset of the UPFs, the subset of the UPFs being connected to the base station, a cell-ID associated with the base station, and routing information indicating routes between the base station and the subset of the UPFs, wherein the SMF builds a list from the UPFs, cell-IDs, and routing information and determines to use the different UPF based on the list.

15. The non-transitory computer-readable media of claim 14, the operations further comprising:

determining that the UE has moved to a second location;

identifying second UPFs available to service the session associated with the UE at the second location;

determining available resources of the second UPFs;

selecting one of the second UPFs to service the session based, at least in part, on the second location and the available resources; and transferring the session to the one of the second UPFs.

16. The non-transitory computer-readable media of claim 14, wherein selecting the UPF comprises:

determining that the UE is a first distance from the UPF;

determining that the UE is a second distance from a second UPF; and selecting the UPF based, at least in part, on the first distance being shorter than the second distance.

17. The non-transitory computer-readable media of claim 14, wherein selecting the UPF is further based on one or more of an available bandwidth, current usage statistics, and forecasted usage statistics of the UPF that indicate a capability of the UPF to provide service at a specified level to the UE.

* * * * *